CARRIER FOR CANS

Original Filed Jan. 9, 1956 2 Sheets-Sheet 1

INVENTOR.
NOBLE ANDRE

BY

Boyken, Mohler & Wood

ATTORNEYS

CARRIER FOR CANS
Original Filed Jan. 9, 1956 2 Sheets-Sheet 2
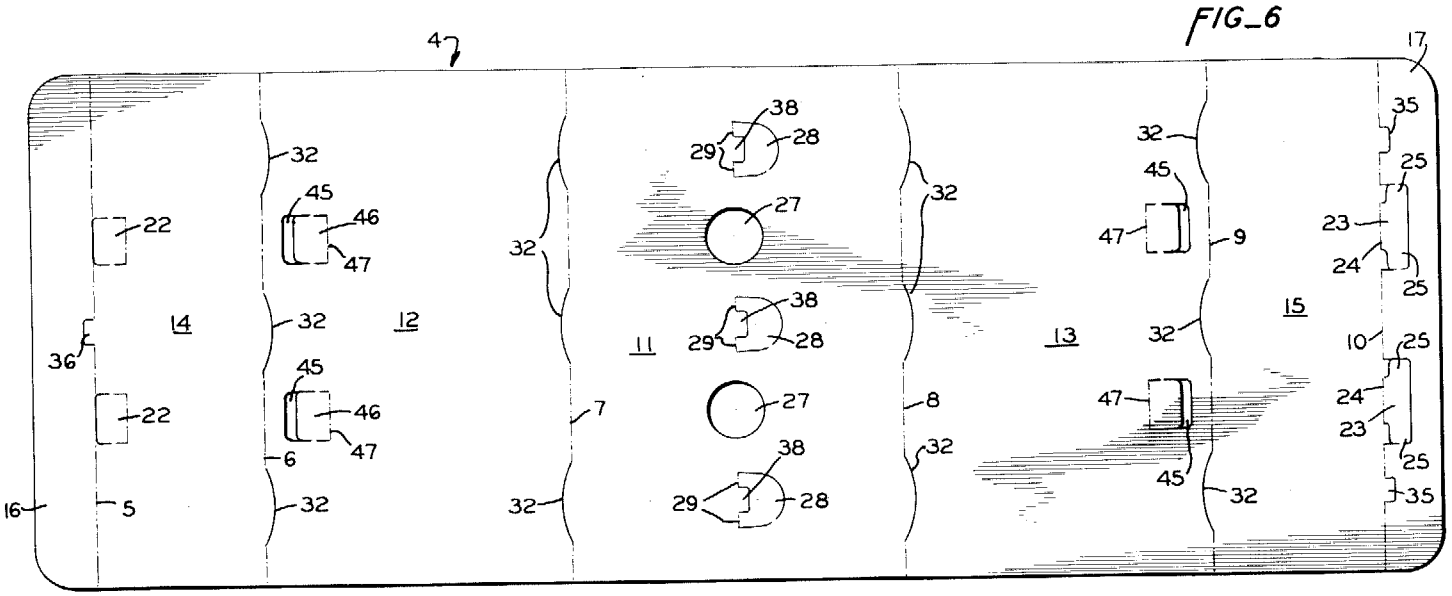
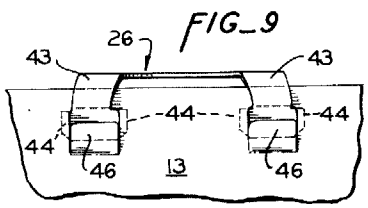
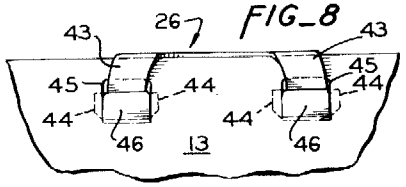
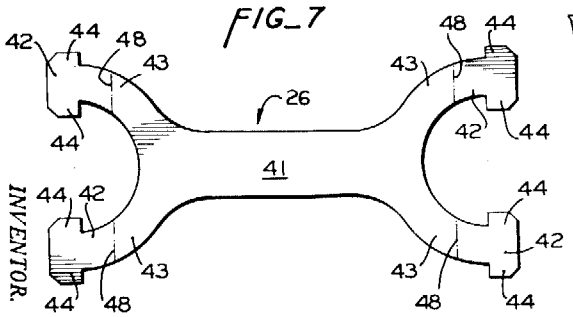
INVENTOR.
NOBLE ANDRE
BY
Boyken, Mohler & Wood
ATTORNEYS United States Patent Office Re. 25,949
Reissued Dec. 14, 1965

25,949

CARRIER FOR CANS

Noble Andre, deceased, late of San Francisco, Calif., by Jean D. Andre, executrix, San Francisco, Calif., assignor to St. Regis Paper Company, a corporation of New York Original No. 2,926,782, dated Mar. 1, 1960, Ser. No. 557,885, Jan. 9, 1956. Application for reissue Feb. 26, 1962, Ser. No. 176,501
4 Claims. (Cl. 206—65)

Matter enclosed in heavy brackets [ ] appears in the original patent but forms no part of this reissue specification; matter printed in italics indicates the additions made by reissue.

This invention relates to an improved carrier for cans of the type disclosed in a copending application, Serial No. 400,675, filed December 28, 1953, now Patent No. 2,867,320, by the same inventor.

This type of carrier or carton may be known as a sleeve and provides a top panel, bottom panel, and side panels folded from a single sheet of cardboard or the like for enclosing the top, bottom, and sides of a pair of rows of upright cylindrical cans. The ends of the carton are open for viewing the ends of the rows of the cans. It is therefore necessary in this type of carrier to provide for holding the cans from movement out of the open ends of the carrier.

It is therefore an object of this invention to provide improved means for retaining cans in an open-ended carrier of the type described.

It is also desirable to eliminate gluing a carrier together wherever possible due to the inherent difficulties in applying glue and handling glued material. The carton of this invention is therefore provided with interlocking means for holding the sleeve together around the cans. In this type of open-ended carton structure it has been found necessary to keep the cans from becoming vertically displaced because this causes the chimes of one row to ride up over the chimes of the adjacent row and the cans are likely to fall out of the open carton ends.

Hence, another object of this invention is the provision of means for preventing vertical displacement of rows of cans in an open-ended carrier.

Still another object of this invention is the provision of means for maintaining the rectangular shape of an open-ended can carton.

It is a further object of this invention to provide a handle for a carrier for cans, which handle lies flat against the carrier and does not obstruct the stacking of several carriers.

A still further object of this invention is the provision of improved means for attaching a handle to a carrier for cans.

It is yet a further object of this invention to provide a carrier for a pair of rows of cans, the chimes of the end cans of which rows project outwardly of the end of the carrier.

Other objects and advantages will become apparent from the following description taken in connection with the accompanying drawings, in which:

FIG. 6 is a plan view of the blank from which the carrier of FIG. 1 is formed;

FIG. 7 is a plan view of the handle of FIG. 1;

FIG. 8 is a side elevational view of a portion of the carrier of FIG. 1 showing the means for attaching the handle thereto; and, FIG. 9 is a side elevational view similar to FIG. 8 but showing the handle raised for carrying.

Figure 1:
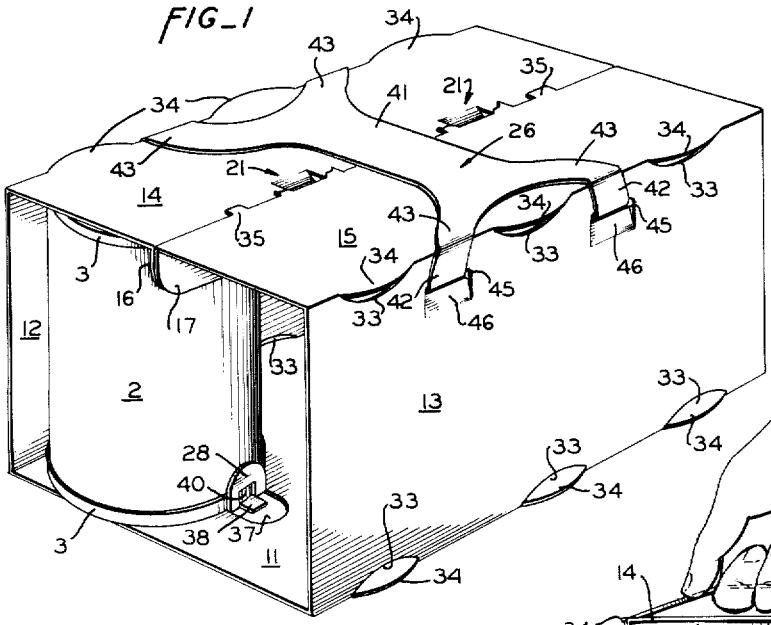
FIG. 1 is a perspective view of the assembled carrier and handle of this invention, showing a single can therein.

The carrier of this invention is for packaging a pair of rows 1 of cans 2, each row consisting of three cans. Such carriers are commonly referred to as "six packs," and are intended for retail distribution. The cans 2 so packed are upright and cylindrical and are provided at their upper and lower ends with radially projecting, annular chimes 3. The rows of cans are normally arranged in a side by side relationship at opposite sides of a central plane, as shown in FIG. 3, so that the chimes of adjacent rows are almost tangent to such plane.

The carrier of this invention is preferably folded from a blank 4 (FIG. 6) which is formed from a single sheet of cardboard or the like. Blank 4 is seen to be generally rectangular in shape and provided transversely of its longest dimension with a plurality of parallel fold lines 5, 6, 7, 8, 9, 10. Said fold lines divide blank 4 into panels respectively designated as bottom panel 11, side panels 12, 13, top panels 14, 15, and extensions 16, 17. Bottom panel 11 is formed about the transverse central plane of blank 4 and bounded by fold lines 7, 8. Side panels 12, 13 adjoin opposite sides of bottom panel 11 and are bounded by fold lines 6, 7, and 8, 9, respectively. Top panels 14, 15 adjoin side panels 12, 13, respectively, and are bounded by fold lines 5, 6 and 9, 10, respectively. Extensions 16, 17 constitute the end portions of blank 4 and adjoin top panels 14, 15 at fold lines 5, 10, respectively.

The blank of FIG. 6 is adapted to be folded into the rectangular, open-ended carton or carrier, generally designated 18, of FIG. 1 for holding the rows 1 of cans arranged as previously described. Hence, bottom panel 11 is adapted to extend over the bottom ends of the rows of cans and has a transverse dimension between fold lines 7, 8, substantially the same as the width of the pair of said rows. Side panels 12, 13 are adapted to be folded upwardly from bottom panel 11 to extend over the oppositely outwardly facing side of cans 2. The height of said side panels between fold lines 6, 7 and 8, 9, respectively, is substantially equal to the height of cans 2. Top panels 14, 15 are each adapted to be folded oppositely inwardly from side panels 12, 13 for extending across the top ends of the cans in each row. Top panels 14, 15 are therefore each approximately half the width of bottom panel 11, or have a transverse dimension between fold lines 5, 6 and 9, 10, respectively, substantially equal to the width of a single row of cans. When blank 4 is folded as previously described, fold lines 5, 10 come together at the central plane between the cans and extensions 16, 17 are adapted to be folded downwardly toward bottom panel 11 for extending between the rows of cans at opposite sides of said central plane. The purpose of extensions 16, 17 is to separate the upper ends of the cans 2 between which they extend (FIG. 2) to overcome the tendency of the chimes 3 of said cans to ride up one over the other. It is obvious that a single extension from one of said top panels will perform this function as efficiently as the two extensions 16, 17 shown.

Figure 3:
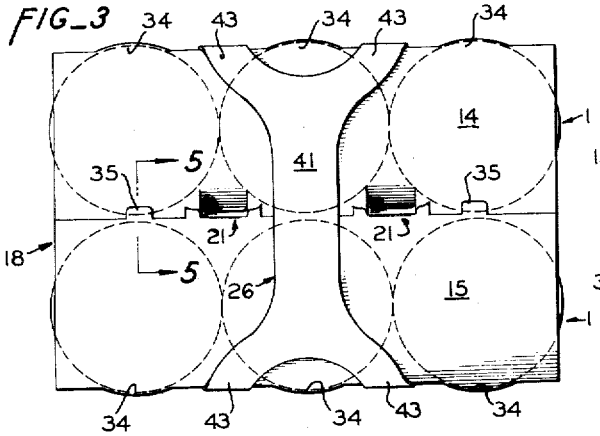
FIG. 3 is a top plan view of the carrier of FIG. 1 packed with two rows of cans.
Figure 5:
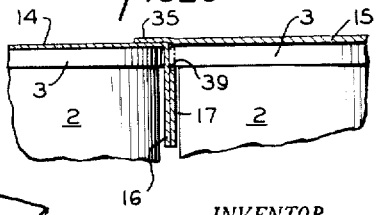
FIG. 5 is an enlarged sectional view taken substantially along line 5—5 of FIG. 3.
Figure 4:
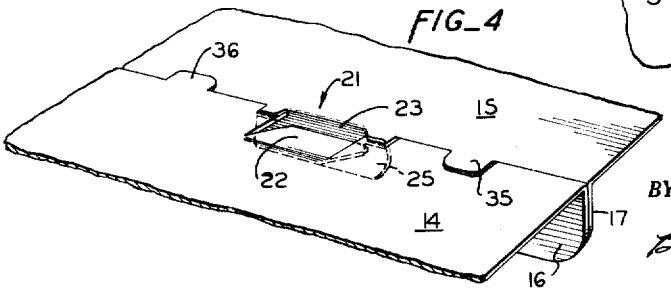
FIG. 4 is an enlarged view of a portion of the top panel of the carrier of FIG. 1, showing the interlocking means and the overlapping tabs thereof.

In order to avoid the use of glue in the carrier of this invention, top panels 14, 15 are held coplanar by a spaced pair of interlocking means, generally designated 21 (FIGS. 1, 3, 4). Each said interlocking means generally comprises a rectangular flap 22 and a T-shaped flap 23 (FIG. 6). Flaps 22 are formed in top panel 14 along folding line 5, being cut away from panel 14 along three edges. The fourth edge of each flap 22 is parallel with and spaced from folding line 5 with the cut edge opposite thereto being along line 5. T-shaped flaps 23 are cut out of extensions 17 and have a very short leg 24 adjoining fold line 10 at the foot of said leg. When extension 17 is folded to lie between the rows of cans, flaps 23 are broken loose therefrom but not folded along line 10, hence, they will overlap flaps 22. Flaps 23 are pushed downwardly thereby swinging flaps 22 downwardly and swinging flaps 23 through the opening left by the rectangular flaps 22 (FIG. 4). It will be noted that the head of each T-shaped flap 23 provides a pair of oppositely, outwardly extending ears 25 which project beyond the confines of each flap 22. When flaps 23 are pushed downwardly through the openings left by flaps 22, as previously described, ears 25 bend inwardly to pass through said openings and then spring back to a position below top panel 14, thus locking panels 14, 15 together. As further security, flaps 22 then assume the position shown in FIG. 4 holding flaps 23 against any tendency to move back out of the openings left by flaps 22. Inasmuch as leg 24 of each flap 23 adjoins the fold line 10, and as the openings formed by the cutting of flaps 23 adjoin the folding crease 5 (FIG. 4), the edges of flaps 23 that extend oppositely away from each leg 24 of each flap 23 will engage the flat side of extension 16 when the package is formed. Because extension 16 is at right angles to the flaps 23, any tension placed on the flaps 23 under a force tending to swing the panels 14, 15 outwardly about folding creases 6, 9, such as the weight of the cans 2, will be taken by the extension in a direction at right angles to the plane thereof. Therefore, the ears 25 on flaps 22 will not slice their way into the extension 16 in the direction of the plane of the latter, as would be the case were the extension 16 generally coplanar with panel 14.

It will be understood that the terms "top" panels and "bottom" panel are used herein merely to facilitate the description. Such description is made with reference to the assembly shown in FIG. 1 in which the handle 26, to be later described, is provided extending over panels 14, 15. On the other hand, the carrier of this invention may be used without handle 26, in which event it may be desirable to invert the carton from the position of FIG. 1 and provide finger holes 27 in panel 11 which would therefore become the top panel. A more apt description of panels 11, 14, 15 might therefore be "end" panels, since each of said panels is adapted to extend over the ends of cans 2, panels 14, 15 extending over the opposite ends of the cans from which panel 11 extends, however, in the claims, in order to distinguish the panels 14, 15 from end panel 11, said panels 14, 15 will be designated "end sections."

Panel 11 is formed with flaps 28 (FIG. 6) which are partially cut out or struck from said panel and bendable along the transverse medial line of blank 4 extending across panel 11. Folding creases 29 are provided along said medial lines at the bases of flaps 28 to facilitate bending said flaps upwardly (FIG. 1) to extend toward extensions 16, 17 in the central plane previously described. Flaps 28 are positioned between adjacent pairs of cans 2 in the two rows 1 of the latter (FIG. 2), for the purpose of preventing chimes 3 of said adjacent pairs of cans from riding up one over the other. In this manner, flaps 28 perform a function similar to extensions 16, 17 at the opposite ends of the cans therefrom.

The carrier or sleeve 18 of this invention is adapted to fit tightly around the rows of cans when folded and locked in the position shown in FIG. 1. Such carrier is, however, open-ended and means must be provided for preventing the end *cans* [cams] in the rows from falling out of the open ends of said carrier. For this purpose a plurality of arcuate cuts 32 are formed in side panels 12, 13 as shown in FIG. 6. Said cuts are spaced along fold lines 6, 7, 8, 9 and interrupt said fold lines. There are an equal number of equally spaced cuts 32 along each of said fold lines 6, 7, 8, 9 and said cuts terminate at said fold lines. Cuts 32 are formed to an arc generally concentric with the ends of cans 2 so that when blank 4 is folded into carrier 18 (FIG. 1) openings 33 are left in side panels 12, 13 for receiving chimes 3 of cans 2 therethrough. Since cuts 32 are formed in side panels 12, 13, when blank 4 is folded a plurality of integral flaps 34 are formed extending oppositely outwardly from the edges of bottom panel 11 and top panels 14, 15 at said cuts. The concentricity of cuts 32 and therefore the edges of flaps 34 with cans 2 will be seen in FIG. 3.

One important function of cuts 32 is to provide openings 33 through which chimes 3 project. Since sleeve 18 holds the end cans in rows 1 tightly together against extensions 16, 17 and flaps 28, said end cans are held by their chimes 3 and openings 33 from falling out of the open ends of carrier 18. The height of openings 33 from the top and bottom panels of carrier 18 is substantially equal to the thickness of each chime 3. Hence, with the chimes in the openings vertical displacement of cans 2 with respect to said panels 12, 13 is prevented. It will also be noted that flaps 34 overlie the outer edges of cans 2 (FIGS. 2, 3) and thereby prevent them from banging against adjacent objects.

It is also desirable to prevent one row of cans from shifting vertically with respect to the other and to retain the rectangular shape of the carrier 18. To enhance this result, a pair of generally rectangular tabs 35 are cut out of extension 17 along three sides, having their fourth side adjoining and interrupting fold line 10. A similar tab 36 is cut out of extension 16 centrally of fold line 5. Tabs 35 may be arranged generally centrally of the end cans in the rows to be enclosed by the carrier. Tabs 35, 36 are adapted to remain integral and coplanar with top panels 15, 14, respectively, when extensions 17, 16 are folded at right angles thereto. As seen in FIGS. 1, 3, 4, 5, tabs 35, 36 overlap the juncture between top panels 14, 15 and overlie the said top panel opposite the one from which they project. The function of tabs 35, 36 is therefore to prevent vertical displacement between top panels 14, 15 at the central plane of the carrier 18. Since the tops of cans 2 are in engagement with said top panels any tendency for said cans to shift vertically with respect to each other is thereby overcome.

It may be seen in FIG. 1 that the bottom ends of the cans of one row overlie an opening 37 left by the folding of flap 28 to a vertical position between the rows. In order to provide support for the edge of the can over said opening 37, a small rectangular tab 38 is cut out along three edges to be struck from flap 28. Along its fourth edge, each tab 38 is integral with bottom panel 11 so as to remain coplanar therewith upon folding flap 28 upwardly between the two rows of cans.

The location of tabs 35, 36, 38 may be such that the apertures 39 (FIG. 5) and 40 (FIG. 1) formed by striking said tabs from extension 17 and flap 28, respectively, are in a position to receive the chimes 3 from the cans adjacent said extension and said flaps.

The vertical dimension or depth of apertures 39, 40 is substantially equal to the thickness of the chimes 3 so that the chime received in each of said apertures (FIG. 5) will be prevented from shifting vertically with respect to extension 17 or flap 28. It is obvious that openings may be formed in extension 16 for a similar purpose. It will be understood that the provision of tabs 35, 36 and 38 along with their respective apertures each contribute to the result of rendering vertical shifting of the cans unlikely and helping to maintain carrier 18 in a substantially rectangular shape.

In FIGS. 1, 3 it is noted that carrier 18 and therefore blank 4 from which it is formed, is cut to a transverse dimension that is shorter than the length of rows 1 of the cans. Hence, the chimes of the end cans in each row project outwardly of the open end of the carrier. This feature is provided for the purpose of enabling the assembly of a plurality of carriers 18 in side by side relationship to form a case lot of cans. Adjacent open ends of the plurality of carriers may be wrapped with a sheet in the form of a tube, similar to each carrier 18, and provided with arcuate cuts similar to cuts 32 for receiving the projecting chimes on the end cams. Therefore, a sleeve may be fabricated to encompass several of the six pack carriers shown using a minimum of material and providing means for retaining the six pack carriers in the sleeve similar to the means provided for retaining the rows of cans in the six pack carrier.

Figure 2:
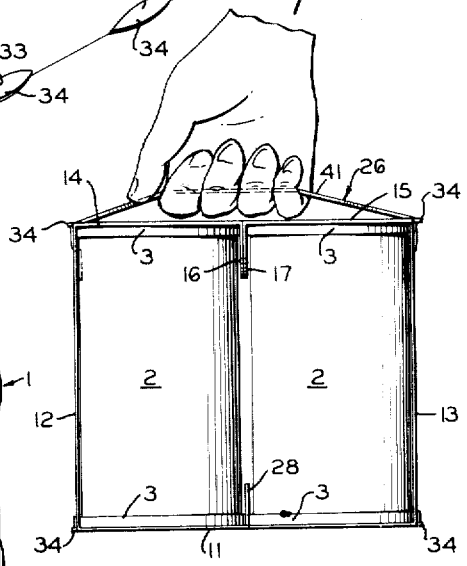
FIG. 2 is an end elevational view of the carrier of FIG. 1, showing it fully packed and in a position for carrying.

For various reasons it may be desirable to provide means other than fingers holes 27 for lifting and carrying the carton 18 of this invention. Hence, carrier 18 may be adapted for use with a handle, generally designated 26 (FIG. 7). Said handle comprises an elongated central portion 41 adapted to extend across top panels 14, 15 (FIG. 1) for gripping by hand. (FIG. 2.) Extending from each end of central portion 41 and integral therewith are a pair of laterally spaced generally T-shaped portions 42. Said T-shaped portions include a curved leg 43 extending from central portion 41 and terminating in a head providing a pair of laterally oppositely outwardly projecting ears 44 (FIG. 7).

Side panels 12, 13 are each provided with a pair of openings 45 spaced from fold lines 6, 9, respectively (FIG. 6). Openings 45 are each formed by cutting away along three sides a generally rectangular flap 46, the other side of which is opposite fold lines 6, 9 and is scored for holding as at 47. The side of flap 46 opposite fold line 47 is cut shorter than the extent of opening 45 so that the edge of opening 45 parallel to fold lines 6, 9 is spaced from said flap.

Handle 26 is laterally creased (FIG. 7) along a pair of parallel lines 48 spaced apart a distance substantially equal to the combined width of top panels 14, 15 of carrier 18. Hence, when handle 26 is placed transversely of panels 14, 15 (FIG. 8) T-shaped portions 42 may be folded downwardly from folding creases 48 to a position overlying openings 45 and flaps 46. In this position, illustrated in FIG. 8, the top edges of ears 44 are seen to lie along the line of the upper edges of flaps 46. Upon pushing T-shaped portions 42 inwardly against flaps 46, ears 44 fold inwardly to pass through opening 45 and then snap back into engagement with the inside of side panels 12, 13 to prevent withdrawal of said T-shaped portions back out through said openings. Flaps 46 are likewise deflected inwardly by said pushing and are resilient enough to snap back to the position shown in FIG. 1 overlying the outside of T-shaped portions 42 to further secure said T-shaped portions from withdrawal.

In the position shown in FIGS. 1, 8 it is noted that handle 26 conforms generally to the shape of the carrier 18 and therefore does not constitute an obstruction to stacking several of said carriers one upon the other. When not in use handle 26 lies flat against the carrier and out of the way. However, when it is desired to lift the carton, sufficient space for the fingers between said handle and the top panels of the carton is provided by lifting said handle as shown in FIGS. 2, 9. Upon lifting said handle, the upper edges of ears 44 are pulled to a position adjacent the upper edge of openings 45 to provide the required spacing between central portion 41 of said handle and top panels 14, 15 of the carrier for the fingers to be inserted therebetween (FIG. 2).

It will be noted that the structure for attaching the handle 26 to carrier 18 is substantially the same as the locking means 21 provided for locking the top panels of the carrier together. Furthermore, the carrier may be provided in the first instance with openings 45 and flaps 46 and handle 26 readily attached thereto as desired. The handle, in extending across top panels 14, 15, also constitutes a safety means in holding said top panels together. It is obvious, however, that handle 26 may as well be applied across panel 11 if it is desired to invert the carton.

Although the invention has been described and illustrated in detail, such is not to be taken as restrictive thereof since it is obvious that modifications could be made in the description without departing from the spirit and scope of the invention.

What is claimed is:

1. A package comprising; a pair of horizontal, parallel rows of upright cylindrical cans, said rows being in side by side relation at opposite sides of a vertical plane and said cans having radially outwardly projecting chimes at their upper and lower ends, an elongated cardboard blank folded along spaced, parallel lines extending normal to the length of said blank defining an end panel intermediate the ends of said blank, a pair of side panels adjoining said end panel, a pair of end sections respectively adjoining said side panels; said end panel extending across and in engagement with one of the corresponding ends of the cans of said rows, said pair of side panels extending over and in close engagement with the oppositely outwardly facing sides of said pair of rows, each of said end sections extending over one row of said cans substantially in engagement with the ends thereof that are opposite to the ends in engagement with said end panel and said end sections terminating at said plane, a flat sided extension integral with one end section of said pair projecting at right angles to the latter to a position between said rows of cans when the other end section of said pair is generally coplanar with said one end section, whereby the flat sides of said extension respectively face the adjacent sides of the cans of said rows, locking tabs integral with said one end section of said pair extending across said plane and across said extension and in engagement with the flat side of said extension that faces the row of cans that are below said one end section for holding said extension between said rows of cans, the cans in said pair of rows being disposed in adjacent pairs with one can of each such adjacent pair thereof being in each row, tabs integral with said end panel extending between the adjacent sides of each of said adjacent pairs of cans, openings formed in said tabs into which the chimes at the ends of the cans that are in engagement with said end panel extend.

2. A package comprising; a pair of horizontal, parallel rows of upright cylindrical cans, said rows being in side by side relation at opposite sides of a vertical plane and said cans having radially outwardly projecting chimes at their upper and lower ends, *an* [and] elongated cardboard blank folded along spaced, parallel lines extending normal to the length of said blank defining an end panel intermediate the ends of said blank, a pair of side panels adjoining said end panel, a pair of end sections adjoining said side *panels* [panel]; said end panel extending across and in engagement with one of the corresponding ends of the cans of said rows, said pair of side panels extending over and in engagement with the oppositely outwardly facing sides of said pair of rows, each of said end sections extending over one row of said cans substantially in engagement with the ends thereof that are opposite to the ends engaging said end panel, separate means respectively integral with at least one end section of the pair thereof and integral with said end panel extending between said rows and respectively terminating adjacent to the opposite ends of said rows, the said means integral with said one end section extending between said rows of cans and being formed with spaced openings in which the chimes on one end of a can at each end of one of said rows is positioned, the said means integral with said end panel being flaps struck from said end panel respectively formed with openings into which the chimes of the cans adjacent to said end panel extend for holding the cans at said end panel against relative movement axially of said cans and longitudinally of said rows, and means integral with said end sections in interlocking relation holding said means integral with said one end section between said *rows* [rods].

3. A package comprising; an elongated cardboard blank folded along spaced, parallel lines extending transversely across said blank to provide a horizontal central panel, a pair of opposed vertical panels and a pair of horizontal end panels of substantially equal length extending toward each other, each of said end panels being disposed over half of said central panel, a pair of parallel rows of upright cylindrical cans, having radially outwardly projecting chimes at their ends, said rows of cans being in side by side substantially engaging relation with each disposed under one of said end panels and on said central panel, openings formed in said blank along the junctures between said central panel and said side panels and between said end panels and said side panels, the chimes at the opposite ends of said cans extending into said openings to restrain the cans against movement thereof relative to said blank longitudinally of said rows, an extension on at least one of said end panels extending at right angles thereto between the chimes on the cans of one row and the chimes on the cans of the other row for preventing the chimes on the cans of said one row from sliding over the chimes on the ends of the cans of said other row, an elongaeted handle extending transversely across said end panels and said extension centrally between the ends of said rows, means for connecting said handle, with said side panels and said handle being free from securement to said end panels to permit grasping the same by the fingers of a hand for carrying said cans and blank, said handle being flexible to enable upward flexing thereof under the weight of said cans when said handle is so engaged by the fingers of the hand and the package is lifted whereby the said side panels will be caused to move tightly against the cans of said rows and the chimes of the cans at the junctures between said end panels and said side panels will be held tightly in the said openings formed in said blank at said junctures during carrying of said *cans* [cams] by said handle.

4. A package comprising; a pair of horizontal, parallel rows of upright cylindrical cans, said rows being in side by side relation at opposite sides of a vertical plane and said cans having radially outwardly projecting chimes at their upper and lower ends, the cans in said pairs of rows being disposed in adjacent pairs with one can of each such adjacent pair thereof being in each row, an elongated cardboard blank folded along spaced, parallel lines extending normal to the length of said blank defining an end panel intermediate the ends of said blank, a pair of side panels adjoining said end panel, a pair of end sections respectively adjoining said side panels, said end panel extending across and in engagement with one of the corresponding ends of the cans of said rows, said pair of side panels extending over and in close engagement with the oppositely outwardly facing sides of said pair of rows, each of said end sections extending over one row of said cans substantially in engagement with the ends thereof that are opposite to the ends in engagement with said end panel, a flat sided extension integral with an end section of said pair projecting at right angles to the latter to a position between the adjacent sides of the cans of said adjacent pairs, whereby the flat sides of said extension respectively face the adjacent sides of the cans of said rows, locking tabs integral with one end section of said pair extending across said plane and across said extension and in engagement with the other end section of said pair for holding said extension between the adjacent sides of the cans of said adjacent pairs, flaps integral with said end panel extending between the adjacent sides of each of said adjacent pairs, and openings formed in said flaps into which the chimes at the ends of the cans that are in engagement with said end panel extend.

References Cited by the Examiner

The following references, cited by the Examiner, are of record in the patented file of this patent or the orginal patent.

UNITED STATES PATENTS

| | | | |
|---|---|---|---|
| 2,645,406 | 7/1953 | Robins | 229—52 |
| 2,656,959 | 10/1953 | Currie. | |
| 2,690,867 | 10/1954 | Potts | 229—52 |
| 2,738,871 | 3/1956 | Vander Lugt | 206—65 |
| 2,751,075 | 6/1956 | Arneson | 206—65 |
| 2,765,073 | 10/1956 | Murray | 206—65 |
| 2,768,741 | 10/1956 | Currie | 206—65 |
| 2,779,499 | 1/1957 | Chidsey | 229—40 X |
| 2,786,572 | 3/1957 | Gentry | 206—65 |

GEORGE O. RALSTON, *Primary Examiner.*

EARLE J. DRUMMOND, *Examiner.*